Figure 1:
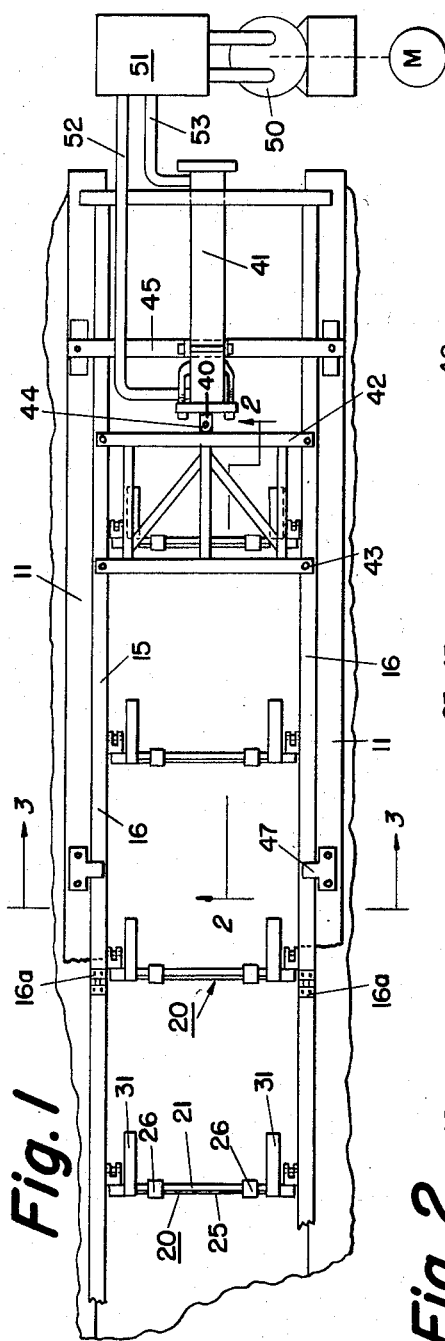

Jan. 12, 1960     H. M. WENGER     2,920,753

CONVEYOR FOR CLEANING POULTRY PITS

Filed Dec. 26, 1957

United States Patent Office 2,920,753
Patented Jan. 12, 1960

2,920,753

CONVEYOR FOR CLEANING POULTRY PITS

Harvey M. Wenger, Terre Hill, Pa., assignor to Terre Hill Machine Company, Denver, Pa., a corporation of Pennsylvania Application December 26, 1957, Serial No. 705,312

10 Claims. (Cl. 198—224)

This invention relates to a conveyor for cleaning poultry pits or the like and has for an object the provision of a reciprocating conveyor of simple construction for rapidly and efficiently removing the litter from poultry pits or troughs.

In the past, various types of conveyor mechanisms have been employed for removing refuse or litter from barns, chicken houses and the like. Such mechanisms have included rather complicated arrangements for raising the pushers or scrapers on the reverse stroke of the conveyor so as to move the scraper clear of the material, on the reverse stroke, which the scraper has pushed into position on the forward stroke. Such mechanisms are not only costly to install, but frequently require maintenance in order to insure that they continue to perform satisfactorily.

In accordance with the present invention the need for such complicated mechanism has been eliminated and the scraper devices are automatically lifted on the reverse stroke of the conveyor by a simple structural member which frictionally engages the bottom of the trough or pit. This is accomplished in a minimum of space without the need of raising the conveyor above the trough or pit.

More specifically, the present invention provides a reciprocating conveyor for cleaning a poultry pit or the like having a pair of spaced track members adapted to be slideably supported at the sides of the pit. One or more scraper devices is pivotally connected to the track members and depends therefrom into the pit. The track members are provided with stop means for limiting pivotal movement of the scraper device on the forward stroke of the conveyor to maintain the scraper device in engagement with the bottom of the pit. The scraper device carries a structural member adapted frictionally to engage the bottom of the pit on the reverse stroke of the conveyor automatically to lift the scraper device above the bottom of the pit by rotation of the scraper device about its pivotal connection in a direction away from the stop means. The scraper device comprises a scraper member which is supported above the bottom of the pit by structure pivoted to the track members. A scraper blade is loosely carried by the scraper member for vertical movement therebetween to automatically adjust the scraper blade to the bottom of the pit on the forward stroke of the conveyor. The structure for automatically lifting the scraper device above the bottom of the pit on the reverse stroke of the conveyor comprises a pivoted member carried by the scraper device in trailing position on the forward stroke of the conveyor. The pivot for the member is disposed below and to one side of the pivot for the scraper device so that when the conveyor is moved in reverse direction the member will frictionally engage the bottom of the pit and cause the scraper blade to be pivoted upwardly to a position above the bottom of the pit during the reverse movement of the conveyor. The scraper blade is thus held above the level of the litter or waste material in the pit during the reverse movement of the conveyor. On the forward movement of the conveyor the lifting members, by reason of their pivotal connection to the scraper device, permit the latter to rotate freely about its pivotal connection to the track members until the scraper device is engaged by the stop means carried by the track members.

Figure 2:
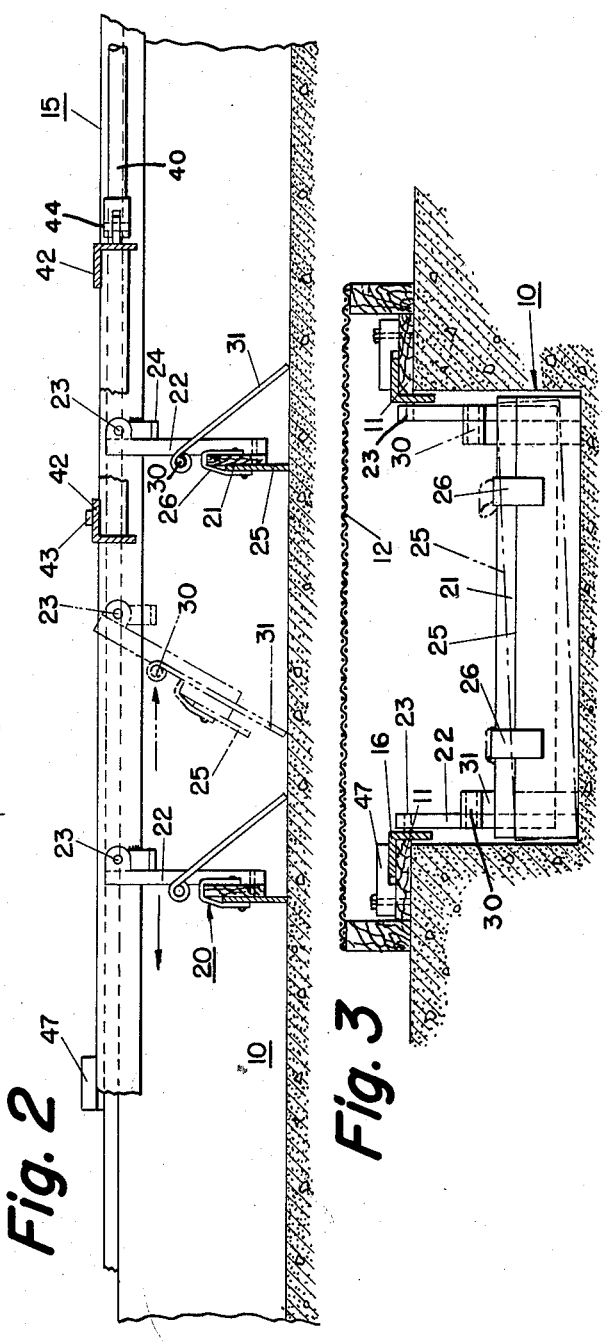
Figure 3:
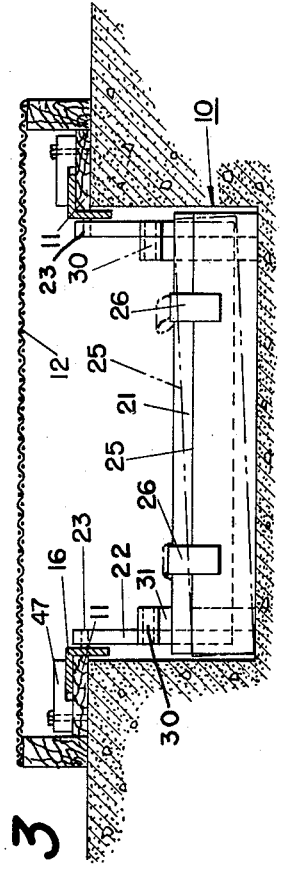

For a more detailed disclosure of the invention and for further objects and advantages thereof reference is to be had to the following description taken in conjunction with the accompanying drawings, in which:

Fig. 1 diagrammatically illustrates a top plan view showing the manner in which the invention is employed for cleaning a trough or gutter such as a poultry pit;

Fig. 2 is a sectional view on enlarged scale taken along the lines 2—2 in Fig. 1 and showing in phantom lines the position of one of the scraper devices on the reverse stroke of the conveyor; and Fig. 3 is a sectional view taken along the lines 3—3 in Fig. 1 showing in phantom lines the "floating" action of the scraper blade.

The present invention provides a low-cost, economical system for cleaning poultry pits or the like. As may be seen in Figs. 1–3, a poultry pit comprises a trough or gutter 10 having side walls which may be formed of wood or, as illustrated, may be formed of cement or similar block construction. The walls of the trough 10 have been provided with wooden top members 11 which serve as a sill for supporting the track of the reciprocating conveyor 15. The reciprocating conveyor 15 comprises a pair of spaced track members 16 which are of right angle construction as may be seen in Fig. 3 and are adapted to slide on the wooden sill members 11. The track members 16 are adapted to support therebetween a plurality of scraper devices 20 which are of identical construction. Each of the scraper devices 20 comprises a scraper or paddle member 21 which is supported between a pair of depending arms 22 which are pivotally connected to the respective track members 16 at pivots 23, Fig. 2. Directly beneath the pivots 23 and also carried by the respective track members 16 are stop members 24 which are adapted to engage the arms 22 and prevent the scraper devices 20 from rotating beyond a vertical position, as shown in Fig. 2, during the forward stroke of the reciprocating conveyor 15. It will be noted that the scraper or paddle members 21 do not engage the bottom of the trough 10. Mounted on each of the scraper members 21 is a scraper blade 25 which is adapted to engage the bottom of the pit 10. The mounting for the scraper blades 25 comprises U-shaped hanger members 26 which are secured to the scraper blades 25 but which are loosely carried by the scraper member 21 for vertical movement therebetween. This floating action of the scraper blades 25 on the scraper devices 20 provides for automatic adjustment of the blades with respect to the bottom of the pit 10 on the forward stroke of the conveyor 15 thus compensating for any unevenness of the bottom of the pit.

When the conveyor 15 is moving on the forward stroke, which is to the left as viewed in Figs. 1 and 2, it is desirable for the scraper devices 20 to engage the bottom of the trough or pit 10 so as to move the refuse or litter to the left-hand end of the pit 10. On the reverse stroke of the conveyor 15, it is necessary for the scraper devices 20 to be actuated in such a manner as to prevent them from moving the refuse or litter in a reverse direction. This action is provided in the present invention by the simple mechanical structure now to be described. As may be seen in Figs. 1–3, the arms 22 are provided with pivots 30 which are disposed forwardly of the pivots 23 and on the opposite side of the arms 22. Carried on these pivots 30 are rigid members 31 which are formed from metal or other suitable material and are relatively narrow in width with respect to the width of the pit 10. On the forward stroke of the conveyor 15, as shown in full line in Fig. 2, the lifting members 31 are adapted to engage the bottom of the pit 10 and form an acute angle therewith. The members 31 trail behind the scraper blade 25.

At the end of the forward stroke of the conveyor 15 the movement of the conveyor is reversed and it moves to the right as viewed in Figs. 1 and 2. During this reverse movement the scraper devices 20 are adapted to be lifted due to rotation about their pivots 23 and moved to a position as shown in phantom line in Fig. 2 so as to raise the scraper blades 25 above the bottom of the pit 10 to clear the refuse or litter in the bottom of the pit on the reverse stroke. This action is accomplished by reason of the fact that the bottom ends of the lifting members 31 engage the bottom of the pit 10 and by reason of the friction created therebetween and the relative position of the pivots 30 and 23 cause the arms 22 to pivot in a clockwise direction from the full line position to the phantom line position as viewed in Fig. 2. This moves the arms 22 out of engagement with the stop members 24 and raises the scraper blade 25 and the scraper member 21 above the level of the refuse of litter in the pit 10.

The foregoing action takes place automatically without the need of additional linkages or power operated mechanisms. As will be seen, the novel scraper devices are of simple, inexpensive construction and provide trouble-free operation with a minimum of maintenance.

The conveyor 15 may be reciprocated by any suitable arrangement. The arrangement shown in Fig. 1 is preferred and comprises a plunger 40 which is adapted to be operated by a hydraulic cylinder 41. As may be seen in Figs. 1 and 2, the plunger 40 is adapted to be secured to the spaced rails 16 by means of a frame 42 which in turn is bolted to the respective rails 16 as by bolts 43. The end of the plunger 40 is adapted to be secured to the operating frame 42 by a bolt 44. The hydraulic cylinder 41 is adapted to be supported in fixed position above the reciprocating conveyor 15 by means of brackets 45 which in turn are supported on the sides of the pit of trough 10. The tracks 16 are adapted to be mounted in sliding engagement with the wooden members 11 as by means of guide members 47.

The hydraulic power unit for the cylinder 41 may take any suitable form and has been illustrated diagrammatically as including a motor M and a pump 50, the latter being connected to a suitable fluid reservoir. Flow lines 52 and 53 are connected to a suitable control valve device 51 and to the opposite ends of the hydraulic cylinder 41 in order to provide the reciprocating movement for the conveyor 15 at desired intervals and rate of speed. The hydraulic power unit may be generally of the type disclosed in my Patent 2,812,055.

In the preferred embodiment of the invention the spacing between the scraper devices 20 is less than the total stroke of the hydraulic cylinder 41. For example, with a spacing of about five feet between the scraper devices 20, a stroke of about six and one-half feet has been found to be satisfactory.

From the foregoing description it will be seen that the present invention provides a simple, efficient pit cleaner for chicken coops or the like. By mounting the conveyor 15 in the pit 10 and beneath the screening 12, as shown in Fig. 3, this system permits regular cleaning of the pit without disturbing laying hens or automatic feeding or watering equipment for the poultry. The automatic elevation adjustment of the scraper blade permits the scraper devices to be used on cement floors, ground fill, wood floors or any other type of flooring and insures an efficient pit cleaning operation. The automatic action of the scraper-lifting members enables the scraping device to pass over even the lightest feathers on the return or reverse stroke of the conveyor without any backdrag. The scraper devices are equally effective to provide cleaned pits whether the refuse or litter be in wet or dry condition.

The discharge end of the pit 10 may extend through the wall of the building and be provided with an extension for dropping the refuse into a truck or spreader or into a conventional elevator. When the extension is inclined so as to discharge at a different level, the track members 16 are hinged at 16a to permit the discharge end section of the conveyor 15 to follow the incline. It is also to be understood that the chicken houses may be provided with a plurality of cross-gutters or pits where more than one pit cleaner feeds the refuse from the cross-gutters into one main discharge gutter. The main discharge gutter can be centrally disposed with the cross-gutters extending to either side therefrom. When the cross-gutters are arranged in straight line pairs, one gutter on each side of the main gutter, a single conveyor mechanism can be used to move the refuse from the pair of cross-gutters to the central main gutter which separates each pair of cross-gutters. This is accomplished by reversing the mounting of the scraper devices at one end of the conveyor with respect to the scraper devices at the opposite end of the conveyor. With this arrangement the single conveyor mechanism will push the refuse from the pair of side gutters to the central discharge gutter which is disposed at a right angle thereto.

The novel reciprocating conveyor has additional applications besides the cleaning of poultry pits and the like. For example, the conveyor has been found useful as a bunk cattle feeder for feeding silage from the silo to the bunk feeder or trough in a barn. In this application the cattle can eat from both sides of the feeder which may extend in length for any desired distance.

While a preferred embodiment has been described and illustrated, it is to be understood that further modifications of the invention may be made without departing from the scope and spirit of the invention as set forth in the appended claims.

What is claimed is:

1. A reciprocating conveyor for cleaning a poultry pit or the like comprising a pair of spaced track members adapted to be slideably supported at the sides of the pit, a scraper device pivotally connected to said track members and depending therefrom into the pit, stop means carried by said track members for limiting pivotal movement of said scraper device on the forward stroke of said conveyor to maintain said scraper device in engagement with the bottom of said pit, and lever structure pivotally carried by said scraper device at a location spaced from said pivotal connection of said scraper device and adapted frictionally to engage the bottom of said pit on the reverse stroke of said conveyor automatically to lift said scraper device above the bottom of said pit by rotation of said scraper device about its pivotal connection in a direction away from said stop means.

2. A reciprocating conveyor according to claim 1 wherein said scraper device comprises a scraper member, structure pivoted to said track members supporting said scraper member above the bottom of said pit, and a scraper blade loosely carried by said scraper member for vertical movement therebetween for automatic adjustment of said blade relative to the bottom of said pit on the forward stroke of said conveyor.

3. A reciprocating conveyor according to claim 1 wherein said lever structure for automatically lifting said scraper device comprises a pivoted member carried by said scraper device in trailing position on the forward stroke of said conveyor, the pivot for said member being disposed below and to one side of the pivot for said scraper device.

4. A reciprocating conveyor according to claim 1 including a plunger secured to said pair of track members, and means for reciprocating said plunger to produce forward and reverse strokes of said conveyor.

5. A reciprocating conveyor according to claim 4 wherein said reciprocating conveyor includes a plurality of scraper devices disposed a predetermined distance apart, and said plunger is adapted for actuation through a stroke having a length greater than the separation distance of said scraper devices.

6. A reciprocating conveyor according to claim 1 wherein said pair of track members include a hinged end section for following an inclined extension of said pit.

7. A reciprocating conveyor for cleaning a poultry pit or the like comprising a pair of spaced track members adapted to be slideably supported at the sides of the pit, a scraper device pivotally connected to said track members and depending therefrom into the pit, stop means carried by said track members for limiting pivotal movement of said scraper device on the forward stroke of said conveyor to maintain said scraper device adjacent the bottom of the pit, and a lever arm pivoted to said scraper device at a location spaced below said pivotal connection of said scraper device to said track members, said lever arm being disposed between said track members and having a length sufficient frictionally to engage the bottom of the pit on the reverse stroke of said conveyor to apply a force to said scraper device through the pivot of said lever arm automatically to lift said scraper device above the bottom of the pit by rotation of said scraper device about its pivotal connection to said track members in a direction away from said stop means.

8. A reciprocating conveyor according to claim 7 wherein a pair of said lever arms is pivotally connected to said scraper device at spaced locations adjacent the corresponding track members of said pair of spaced track members.

9. A reciprocating conveyor according to claim 7 wherein said scraper device comprises a paddle member supported between a pair of depending arms which is pivotally connected to said pair of spaced track members, and a pair of said lever arms respectively pivoted to said pair of depending arms at a location below said first-named pivot, said lever arms being adapted to be carried in a trailing position on the forward stroke of said conveyor.

10. A reciprocating conveyor for cleaning a poultry pit or the like comprising a pair of spaced track members adapted to be slideably supported at the sides of the pit, a double-acting hydraulic cylinder supported in fixed position above said conveyor, a plunger within said cylinder, frame means secured to said pair of spaced track members, said plunger being connected to said frame means for reciprocation of said track members, a scraper device pivotally connected to said track members and depending therefrom into the pit, means for limiting pivotal movement of said scraper device on the forward stroke of said conveyor to maintain said scraper device in a substantially vertical position closely adjacent the bottom of the pit to discharge refuse therefrom, and a lever arm pivoted to said scraper device at a location spaced below said pivotal connection of said scraper device to said track members, said lever arm having a length sufficient to trail behind said scraper device on said forward stroke and frictionally engage the bottom of the pit so that upon reverse movement of said conveyor by said hydraulic cylinder said lever arm applies a force to said scraper device through said pivot of said lever arm automatically to rotate said scraper device about its pivotal connection to said track members and move said scraper device toward a horizontal position and above the bottom of the pit.

References Cited in the file of this patent

UNITED STATES PATENTS

| 1,372,137 | Haverly | Mar. 22, 1921 |
| 2,416,469 | Cordis | Feb. 25, 1947 |
| 2,495,096 | Grimaldi | Jan. 17, 1950 |